United States Patent
Schrewe

(10) Patent No.: US 6,390,653 B1
(45) Date of Patent: May 21, 2002

(54) LAMP FOR VEHICLES

(75) Inventor: Elmar Schrewe, Anroechte (DE)

(73) Assignee: Hella Aerospace GmbH, Lippstadt (DE)

(*) Notice: Subject to any disclaimer, the term of this patent is extended or adjusted under 35 U.S.C. 154(b) by 0 days.

(21) Appl. No.: 09/725,002

(22) Filed: Nov. 29, 2000

(30) Foreign Application Priority Data

Sep. 6, 2000 (DE) .......................... 100 44 146

(51) Int. Cl.⁷ .............................................. F21V 21/00
(52) U.S. Cl. .................... 362/374; 362/196; 362/546; 362/440; 362/470
(58) Field of Search ................ 362/470, 471, 362/472, 374, 375, 440, 196, 546

(56) References Cited

U.S. PATENT DOCUMENTS

| 3,601,596 A | * | 8/1971 | Magi ........................... 362/376 |
| 4,091,444 A | * | 5/1978 | Mori ........................... 362/374 |
| 4,414,614 A | * | 11/1983 | McMahan .................. 362/269 |
| 5,560,707 A | * | 10/1996 | Neer ........................... 362/376 |

FOREIGN PATENT DOCUMENTS

| DE | 1604889 | 4/1950 |
| DE | 8109134 | 8/1981 |
| EP | 0512380 A2 | 11/1992 |

* cited by examiner

Primary Examiner—Sandra O'Shea
Assistant Examiner—Ali Alavi
(74) Attorney, Agent, or Firm—Birch, Stewart, Kolasch & Birch

(57) ABSTRACT

A lamp for a vehicle, in particular for aircraft, has a housing in which a light source is arranged, with the housing including a first housing part detachably attached to a second housing part, the first and second housing parts being coaxially arranged. Each of the first and second housing parts has at least one projection extending in the axial direction from an edge thereof, for inter-engaging in a corresponding recess of the other housing part. Each projection has a retaining nose protruding in the radial, transverse, direction to form a groove into which a locking element can be inserted to lock the first housing part to the second housing part.

10 Claims, 3 Drawing Sheets

LAMP FOR VEHICLES

This application claims a priority date from German application DE 100 44 146.7, filed Sep. 6, 2000, and the contents of that application are incorporated by reference herein.

BACKGROUND OF THE INVENTION

This invention relates to a lamp for vehicles, in particular for aircraft, of a type having a housing in which a light source is arranged, with the housing including a first housing part detachably connected to a second housing part, with the first and second housing parts being arranged coaxially to one another.

European Patent Application 0 512 380 A2 describes a lamp for vehicles having a housing containing a light source, where the housing includes a first housing part connected to a support plate and a second housing part arranged coaxially with and detachable from the first housing part. To connect the first and second housing parts, a latching device is provided, having latching elements with a plurality of latching projections or latching cams arranged in the axial direction. This mechanism for joining housing parts has been basically successful, but it has the disadvantage that the housing must be assembled from a front side and a rear side of a support plate at an opening in the support plate provided for the lamp. It has been found that it is relatively time-consuming to mount the first housing part and the second housing part from different directions of assembly on the support plate, which usually extends in the vertical direction. Furthermore, this type of assembly means that one housing part must always be arranged to protrude from the front side of the support plate. This is not always desirable for optical reasons.

Therefore, it is an object of this invention to improve upon a lamp for vehicles such that assembly complexity is reduced.

SUMMARY OF THE INVENTION

According to principles of this invention a light-source-containing housing for a lamp for a vehicle, in particular for an aircraft, includes a first housing part and a second housing part that are detachably, coaxially, joined together, with each of the first and second housing parts having at least one projection extending away from an edge thereof in the axial direction on a side facing the other housing part, with the projections of each housing part inter-engaging in a corresponding recess of the other housing part. Each projection has a retaining nose protruding radially, transverse to the axil direction, to form a groove there between into which a securing element can be inserted to retain the first housing part relative to the second housing part by clamping therein.

A particular advantage of this invention is that the structure of the projections and recesses in conjunction with the retaining noses protruding in the transverse direction, allows a simple method of joining the first and second housing parts. The first and second housing parts are joined together in a form-fitting manner, with the retaining noses that protrude laterally from the projections forming bordering walls and, with partial sections of the projections, forming a groove to receive the securing element. In the assembled position, this securing element engages both the projections of the first housing part and the second housing part, thus assuring a secure connection. Reliability in assembly is further increased by the fact that a person performing the assembly can discern unambiguously a desired assembly status on the basis of a position of the securing element.

According to a refinement of this invention, the first and second housing parts each has a plurality of projections distributed peripherally so that, in an assembled configuration, the edges of the first and second housing parts engage one another in a claw-like manner. In this way, assembly of the first and second housing parts into a proper position is advantageously simplified.

According to a preferred embodiment of this invention, a clearance spacing between the retaining noses, arranged to be offset from one another in the axial direction of the housing parts, is adapted to a diameter of the securing element, so that a compressing force which holds the first and second housing parts together in a rattle-free manner always acts in the axial direction.

According to another embodiment of this invention, each of the retaining noses, on a side facing the securing element, has an inclined surface such that the groove tapers in the direction of projection of the nose. In this way, secure locking of the first and second housing parts is made possible even when there are deviations from tolerances of the securing element, with an unambiguous seating of the securing element in the groove being assured by a length of the inclined surface, which is adapted to the diameter of the securing element.

BRIEF DESCRIPTION OF THE DRAWINGS

Further benefits, characteristics and details of the invention are explained in more detail below using an embodiment shown in the drawings. The described and drawn features, can be used individually or in preferred combinations in other embodiments of the invention. The foregoing and other objects, features and advantages of the invention will be apparent from the following more particular description of the preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF THE INVENTION

Figure 1:
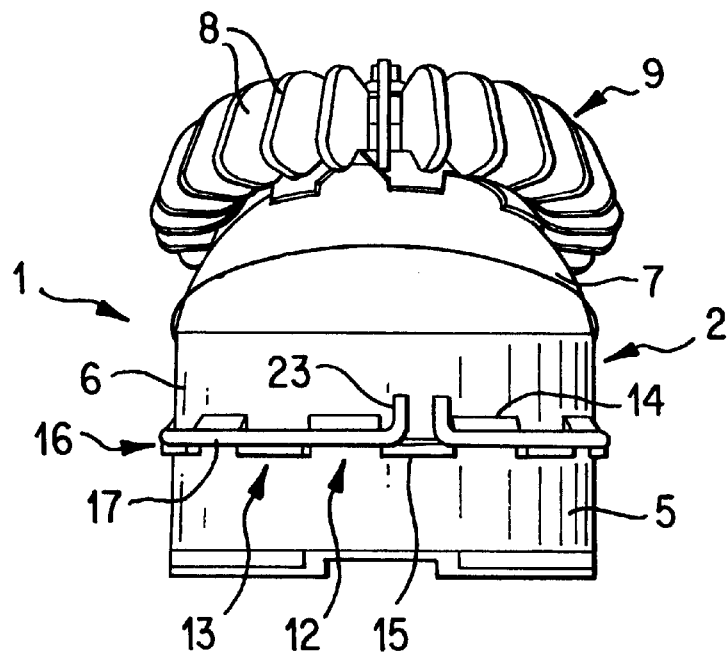
FIG. 1 is a side elevation of a lamp of this invention.
Figure 2:
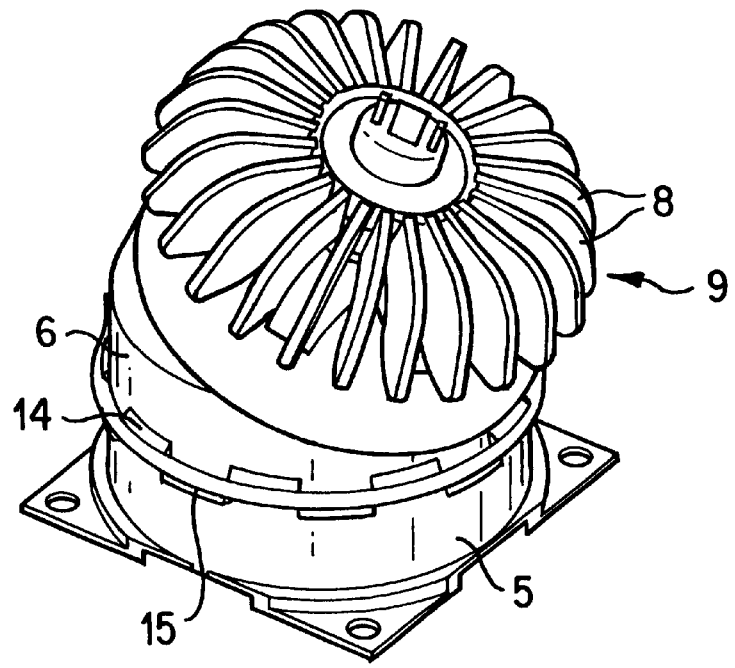
FIG. 2 is a perspective view of the lamp.
Figure 3:
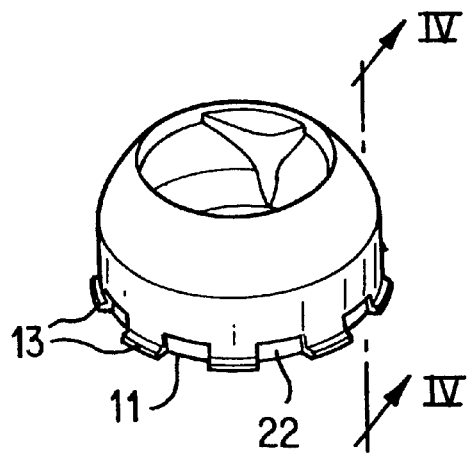
FIG. 3 is a perspective view of a second housing part of a housing of the lamp.

A lamp of this invention is for use in vehicles, preferably in aircraft, where it can be used as a reading light.

A lamp 1 has a housing 2 which mainly includes a first housing part 5 joined in a form-fitting manner to a back side 3 of a support plate 4 of an aircraft and a second housing part 6, which is joined to the first housing part 5 in a non-positive, or frictional, manner. The first and second housing parts 5, 6 are structured so they are essentially hollow cylinders or cup-shaped. The second housing part 6 has an opening on a side facing away from the first housing part 5 so that a third housing part 7 can be placed on the second housing part 6.

The third housing part 7 has a centrally positioned light source and is provided with a cooling device 9 of a plurality of cooling ribs 8 arranged in a star pattern, on a side facing away from the second housing part 6, to cool the light source. The light source may be structured as an incandescent bulb or as a light-emitting diode. The third housing part 7 may be in a fixed position or it may be pivotal relative to the second housing part 6.

When assembled, the first and second housing parts 5, 6 are arranged coaxially with one another, each having an edge 10 and 11 with teeth on a side facing the other. The teeth are formed by a plurality of projections 12 on the first housing part 5 and projections 13 on the second housing part 6 extending in an axial direction. Each of the projections 12, 13 has a retaining nose 14 and 15 protruding perpendicularly, radially, outwardly, in a transverse direction at a free end thereof. The edges 10, 11 of the first and second housing parts 5, 6 are structured to be circular.

In the assembled position, the retaining noses 14, 15 of the projections 12 and 13 are arranged so that they are offset from one another about a periphery of housing parts 5, 6 and thereby form a ring groove 16 to receive a securing element structured as a clamping ring.

As shown in FIG. 1, a clearance space between the offset retaining noses 14, 15 in the axial direction is sized such that the clamping ring 17 makes clamping contact with a base side 18 of the ring groove 16.

To assure secure seating of the clamping ring 17 in the groove 16, the retaining noses 14, 15 are structured to be hook-shaped with an inclined surface 19 arranged on a side facing the locking ring 17. The inclined surface 19 is oriented so that the groove 16 tapers inwardly in a mounting direction of the clamping ring 17. The inclined surface 19 forms an acute angle to a perpendicular plane of the housing parts 5, 6. Due to this tub-shaped design of the ring groove 16, differences in tolerance with respect to the clamping ring 17 can be compensated. Because the clamping ring 17 is structured so that it has a clamping effect inwardly in the radial direction when inserted, or positioned, in the ring groove 16, the retaining noses 14 of the first housing part 5 are spread from the retaining noses 15 of the second housing part 6 in such a way as to assure a rattle-free seating of the two housing parts 5, 6.

A width of the base side 18 may be structured to be smaller than a diameter of the clamping ring 17. This takes into account that the clamping ring 17 does not rest on the base side 18. It is important that the lengths of the retaining noses 14, 15 be coordinated with the diameter of the clamping ring 17. The lengths of the retaining noses 14, 15 with the inclined surfaces 19 thereof should be greater than the radius of the clamping ring 17.

Figure 4:
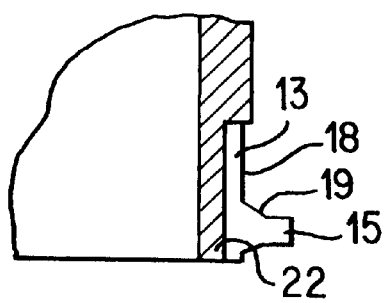
FIG. 4 is a fragmented sectional view taken on line IV—IV in FIG. 3 of a retaining nose on the second housing part.
Figure 5:
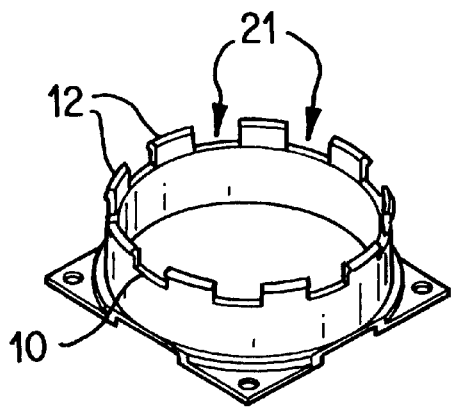
FIG. 5 is a perspective view of a first housing part of the housing.

As shown in FIG. 5, depressions are formed as recesses 21 between the projections 12 of the first housing part 5. As shown in FIG. 4, the depressions of the second housing part 6 are structured as thin-walled seats 22 which have a substantially thinner wall thickness than do the projections 13. The seats 22 are arranged on an inside flush with insides of adjacent projections 13.

To assemble the first and second housing parts 5, 6, insides of the projections 12 of the first housing part 5 are placed in contact with the thin-walled seats 22 of the second housing part 6. The projections 12, 13 on housing parts 5 and 6 inter-engage in a claw-like manner, with the housing parts 5, 6 already assuming their end positions. The widths of the projections 12, 13 and of depressions 21, 22 may be in a range of 0.5 to 1.5 cm. As an alternative, it is also possible for each housing part 5, 6 to have only a single projection and a single depression The projection would then cover the edge 10, 11 over an angle of 180E.

For further assembly of the lamp 1, after assembling the first and second housing parts 5, 6, the clamping ring 17 is inserted into the ring groove 16. The clamping ring 17 has hook-shaped ends 23 so that the clamping ring 17 can be brought into an intended position without the assistance of tools.

Figure 6:
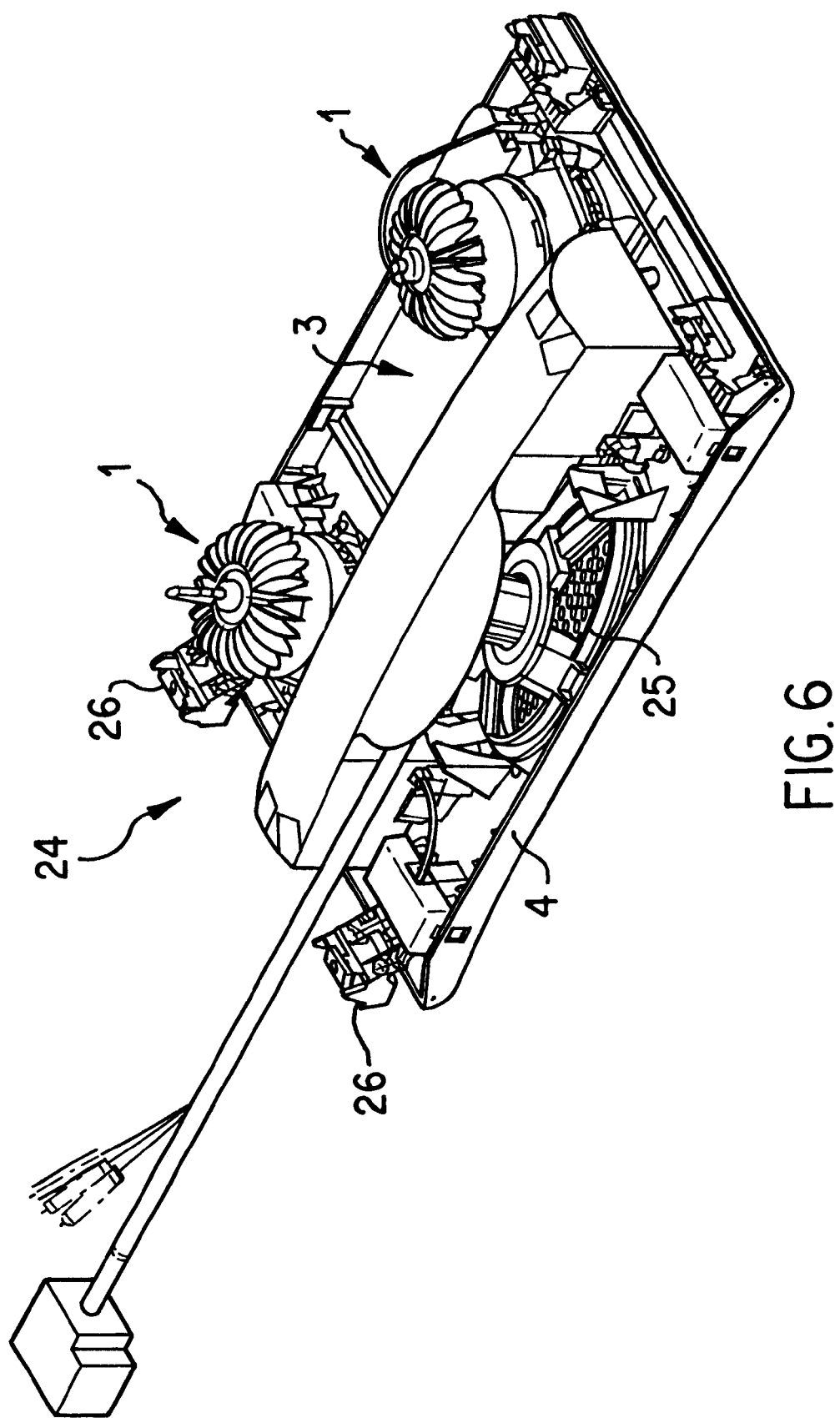
FIG. 6 is a perspective view of a support plate, shown from a back side, with housings for two lamps being mounted on the support plate.

The third housing part 7 is preferably pre-mounted on the second housing part 6, so that, in order to replace the light source, only the second housing part 6 need be detached from the first housing 5 by removing the clamping ring 17. As shown in FIG. 6, the first housing part 5 is fixedly joined to the support plate 4 of a basic light unit 24 by screws. The support plate 4 has two oppositely-positioned lamps in one elongated portion and a loudspeaker 25 in an adjacent elongated portion. The light base unit 24 is pivotally mounted at an edge to a support (not shown) by fastening devices 26.

To assemble the lamps 1 or to replace light sources therein, the support plate 4 is brought into a vertical position. Then the first housing part 5 can be mounted on the rear side 3 of the support plate 4. In another step, the second housing part 6 is then placed on the first housing part 5 and locked onto the first housing part 5 by inserting the clamping ring 17 into the ring groove 16. It is advantageous for the first housing part 5 to be already pre-mounted on the support plate 4. To change the light source, one need only unlock the second housing part 6 from the first housing part 5 by removing the clamping ring 17.

I claim:

1. A lamp for a vehicle, in particular for aircraft, having a housing in which is arranged a light source, said housing comprising a first housing part and a second housing part that are detachably, coaxially, joined together, wherein the first housing part (5) and the second housing part (6) each has at least one projection (12, 13) extending in an axial direction from an edge (10, 11) thereof, with the edge (10) of the first housing part (5) opposing the edge (11) of the second housing part (6) so that each said projection engages in a corresponding recess (21, 22) of the other housing part (5, 6), wherein each projection (12, 13) has a retaining nose (14, 15) protruding in a transverse radial direction to form a groove (16) there between into which a locking element (17) can be inserted for locking the first housing part (5) to the second housing part (6).

2. The lamp of claim 1, wherein the first housing part (5) and the second housing part (6) each has a plurality of projections (12, 13), so that the edges (10, 11) of the first and second housing parts (5, 6) inter-engaging in a claw-like manner.

3. The lamp of claim 1, wherein the projections (12, 13) of the respective first and second housing parts (5, 6) are arranged to be relatively offset from one another in a peripheral direction in an assembled state of the housing parts, with an inside axial spacing between the retaining noses (14, 15) of the first and second housing parts (5, 6) being adapted to a diameter of the locking element (17).

4. The lamp of claim 2, wherein widths of the projections (12, 13) are in a range of from 0.5 cm to 1.5 cm.

5. The lamp of claim 1, wherein each of the retaining noses (14, 15) has an inclined surface (19) on a side facing the locking element (17) such that the groove (16) tapers inwardly in a direction of assembly of the locking element (17).

6. The lamp of claim 1, wherein each inclined surface (19) forms an acute angle with a perpendicular plane of the housing parts (5, 6), with a length of the inclined surface (19) being greater than a radius of the locking element (17).

7. The lamp of claim 2, wherein the recess, between two adjacent projections (13) of one of the first housing part (5) and the second housing part (6) is structured as a thin-walled seat (22) which extends flush with an inside of the adjacent projection (14).

8. The lamp of claim 1, wherein the locking element (17) is structured as a locking ring.

9. The lamp of claim 1, wherein each retaining nose (14, 15) is arranged on a free end of the a projection (12, 13).

10. A vehicle employing the lamp of claim 1, wherein the first housing part (5) is fixedly connected to a support plate (4) of the vehicle.

* * * * *